United States Patent
Wu et al.

(10) Patent No.: US 12,376,010 B2
(45) Date of Patent: Jul. 29, 2025

(54) CELL SEARCH BASED ON SPATIAL-TEMPORAL STATISTICAL INFORMATION

(71) Applicant: MediaTek Inc., Hsinchu (TW)

(72) Inventors: Pei-Tsung Wu, Hsinchu (TW); Shang-An Tsai, Hsinchu (TW); Yi-Chun Chu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 390 days.

(21) Appl. No.: 17/537,848

(22) Filed: Nov. 30, 2021

(65) Prior Publication Data

US 2022/0191775 A1   Jun. 16, 2022

Related U.S. Application Data (60) Provisional application No. 63/123,504, filed on Dec. 10, 2020.

(51) Int. Cl.
*H04W 48/16* (2009.01)
*H04W 36/32* (2009.01)

(52) U.S. Cl.
CPC ......... *H04W 48/16* (2013.01); *H04W 36/322* (2023.05); *H04W 36/324* (2023.05)

(58) Field of Classification Search
None
See application file for complete search history.

(56) References Cited

U.S. PATENT DOCUMENTS

| | | | |
|---|---|---|---|
| 8,175,567 B2 | 5/2012 | Hoefel | |
| 8,554,163 B2 | 10/2013 | Deshpande | |
| 9,807,661 B1* | 10/2017 | Manepalli | H04W 52/0258 |
| 9,936,450 B2 | 4/2018 | Onaka | |
| 9,980,225 B2 | 5/2018 | Damji | |
| 10,531,355 B2 | 1/2020 | Xu | |
| 2011/0136530 A1 | 6/2011 | Deshpande | |
| 2013/0196659 A1 | 8/2013 | Damji | |
| 2014/0269491 A1* | 9/2014 | Edge | H04W 40/24 |
| | | | 370/328 |
| 2016/0309400 A1* | 10/2016 | Swaminathan | H04W 84/02 |
| 2017/0055108 A1* | 2/2017 | Jeon | H04W 4/40 |
| 2018/0176065 A1 | 6/2018 | Deng | |
| 2018/0184369 A1 | 6/2018 | Onaka | |
| 2020/0029297 A1* | 1/2020 | Baek | H04W 76/11 |
| 2022/0346031 A1* | 10/2022 | Nayak | H04W 48/16 |

FOREIGN PATENT DOCUMENTS

KR   20110135174 A   12/2011

* cited by examiner

*Primary Examiner* — German Viana Di Prisco
(74) *Attorney, Agent, or Firm* — Tong J. Lee (57) ABSTRACT

A user equipment terminal (UE) performs cell search in a wireless network. The UE determines a search pattern based on statistics of search trials performed at one or both of a location and time in a recurrent time cycle. The search pattern includes a sequence of alternating search durations and non-search durations for a configurable number of searches. Furthermore, the search pattern includes the search durations or the non-search durations that increase, decrease, or no-change according to probability derived from the statistics. The UE performs the cell search according to the search pattern.

18 Claims, 7 Drawing Sheets

CELL SEARCH BASED ON SPATIAL-TEMPORAL STATISTICAL INFORMATION

CROSS-REFERENCE TO RELATED APPLICATIONS

This application claims the benefit of U.S. Provisional Application No. 63/123,504 filed on Dec. 10, 2020, the entirety of which is incorporated by reference herein.

TECHNICAL FIELD

Embodiments of the invention relate to wireless communications; more specifically, to a cell search process in a wireless network.

BACKGROUND

Cell search is the procedure used by a user equipment terminal (UE) to acquire time and frequency synchronization with a cell and decode the Cell ID of that cell. A UE can acquire the time and frequency synchronization based on downlink reference signals from a base station.

The Fifth Generation New Radio (5G NR) is a telecommunication standard promulgated by the 3rd Generation Partnership Project (3GPP™) for mobile broadband communications to significantly improve performance metrics such as latency, reliability, throughput, etc. In 5G NR, the cell search is based on the detection and decoding of a synchronization signal block (SSB), which includes a primary synchronization signal (PSS), a secondary synchronization signal (SSS), and a demodulated reference signal (DMRS). An SSB is detected by a UE during an SSB-based measurement timing configuration (SMTC) window. The UE can calculate the cell ID from information in the PSS and the SSS. The 5G NR further defines a sequence of steps for the UE to perform after cell ID acquisition to receive 5G cell service.

Improvements to the cell search process can benefit network operators and users of wireless communications. The improvements can apply to a wide range of multi-access technologies and the telecommunication standards that employ these technologies.

SUMMARY

In one embodiment, a method is provided for a UE to perform cell search in a wireless network. The method comprises determining a search pattern based on statistics of search trials performed at one or both of a location and time in a recurrent time cycle; and performing the cell search according to the search pattern. The search pattern includes a sequence of alternating search durations and non-search durations for a configurable number of searches. Furthermore, the search pattern includes the search durations or the non-search durations that increase, decrease, or no-change according to probability derived from the statistics.

In another embodiment, an apparatus is provided for wireless communication, where the apparatus is a UE. The UE comprises antenna circuitry; a memory; and processing circuitry coupled to the memory and operative to perform cell search. The processing circuitry is further operative to determine a search pattern based on statistics of search trials performed at one or both of a location and time in a recurrent time cycle, and perform the cell search according to the search pattern. The search pattern includes a sequence of alternating search durations and non-search durations for a configurable number of searches. Furthermore, the search pattern includes the search durations or the non-search durations that increase, decrease, or no-change according to probability derived from the statistics.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a mechanism for a UE to perform cell search in a wireless network. The mechanism balances the need for cell ID acquisition and reduced UE power consumption. The UE determines a search pattern based on statistics of search trials for a given location and/or a given time. The term "search pattern" indicates a sequence of alternating search duration and non-search duration. The term "given time" or "given time period" herein may refer to a time instant or period in a recurring time cycle, such as time of day, day(s) of the week, etc. In each search trial, the UE determines a search pattern to conduct the cell search. The statistics of search trials are used by the UE to determine parameters of the search pattern, where the parameters include but are not limited to: the length of each search duration, the length of each non-search duration length, and the number of search durations in the search pattern. These parameters can be configured to produce a search pattern that includes search durations that are increasing, decreasing, or no change in length, and non-search durations that are increasing, decreasing, or no change in length from the beginning to the end of the search pattern. The following description also mentions the term "search timer," which can be used by a UE to set the starting time for each search duration. Furthermore, the term "search interval" is used to indicate how frequent a UE performs cell search; longer search intervals mean less frequent cell searches and shorter search intervals mean more frequent cell searches. The UE performs a cell search process during each search duration. The UE does not perform cell search during any non-search duration; e.g., the UE may be in an idle or sleep state, or may be perform operations that are not cell search operations.

The statistics of cell search are stored and maintained in a database that may be retrieved by the UE and may also be updated by the UE. The statistics may be modeled as a probability model that indicates the probability of a successful cell search for a given location and/or a given time. The probability model indicates the change in the probability temporally and/or spatially. When the probability is high, the UE may attempt to accelerate cell acquisition by using a search pattern that includes one or more of the following attributes: a longer search duration, a shorter non-search duration, more frequent searches, and more searches in a search trial. When the probability is low, the UE may attempt to save power by using a search pattern that includes one or more of the following attributes: a shorter search duration, a longer non-search duration, less frequent searches, and fewer searches in a search trial. The UE may change some of the parameters and keep some other parameters unchanged in a search pattern. After each search trial, UE may record the statistics of the trial result or may maintain the probability model for the given cell in the given time interval. The statistics may be recorded in the form of a histogram, a probability model, or another statistical representation. Next time when the UE performs a cell search at the same location and/or the same given time period, UE can utilize the statistics or probability model to determine a search pattern for a new search trial.

In one embodiment, the UE may gradually decrease the lengths of search durations in a search pattern when the probability is high, and gradually increases the lengths of search durations in a search pattern when the probability is low. In another embodiment, the UE may gradually search more and more frequently when the probability is trending higher and higher, and gradually search less and less frequently when the probability is trending lower and lower. As an example, the UE may adjust the non-search durations in a search pattern to change how frequent it is for the UE to search.

Cell services may vary temporally and spatially. For example, in the initial deployment stage, 5G coverage may be more widely available in big cities than in rural areas. Moreover, some 5G operators may temporarily shut down 5G base stations (e.g., gNB) at a certain time (e.g., night time) for power saving. The temporary downtime may differ by service carriers, operator settings, or other factors. In some regions, cell services may be provided by a non-terrestrial network (NTN). For example, a 5G satellite network may use nonstationary satellites to provide or enhance 5G coverage. However, there may be intermittent downtime in the cell service provided by nonstationary satellites as the link quality is susceptible to satellite movements.

The temporal and spatial effect on the availability of cell service can happen to any wireless communication technology. Thus, while the disclosed method, as well as the apparatus and the computer product implementing the method, may be described using terminology commonly associated with 5G or NR wireless technologies, the present disclosure can be applied to other multi-access technologies and the telecommunication standards that employ these technologies.

Figure 1:
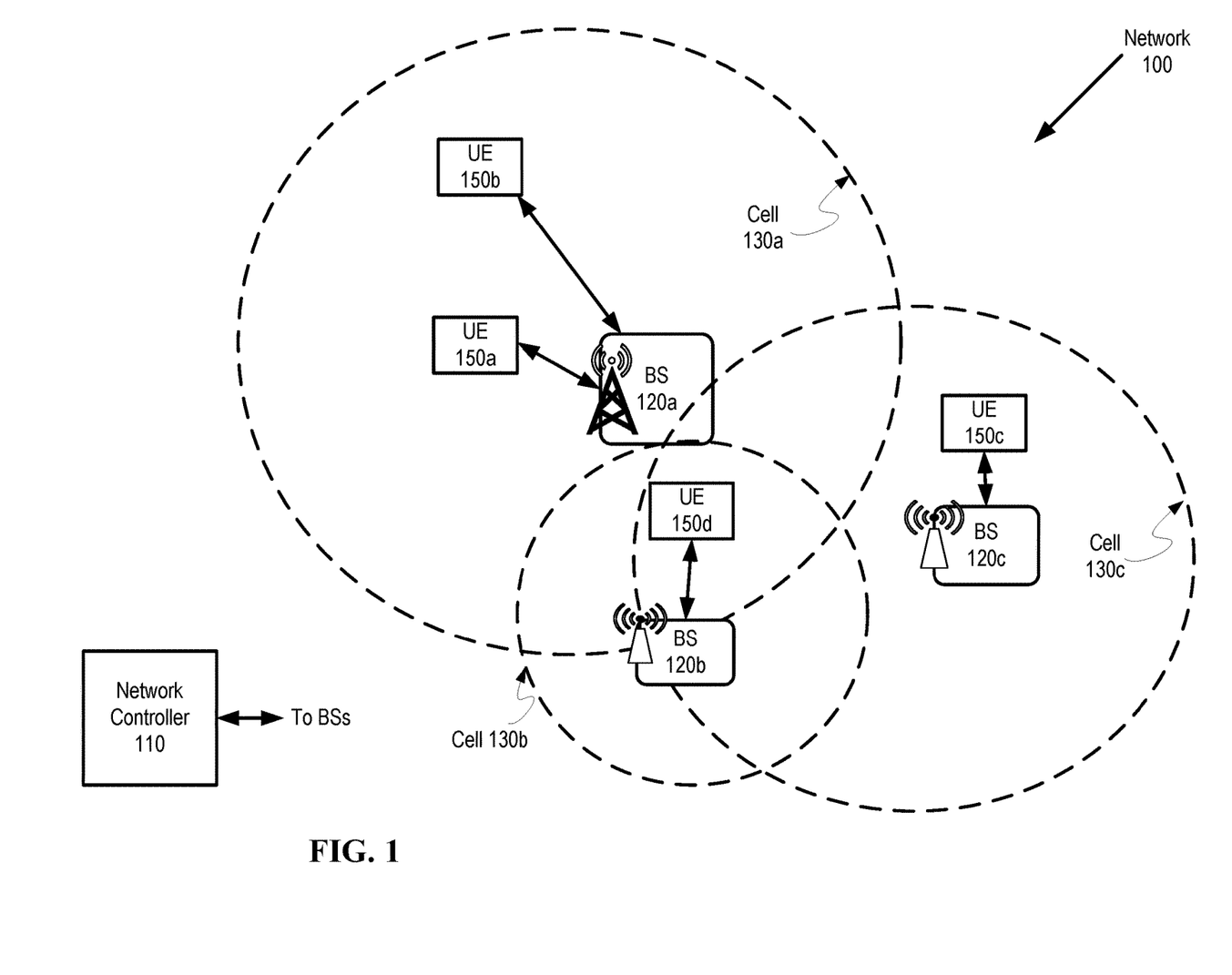
FIG. 1 is a diagram illustrating a network in which the embodiments of the present invention may be practiced.

FIG. 1 is a diagram illustrating a network 100 in which embodiments of the present invention may be practiced. The network 100 is a wireless network which may be a 5G NR network. The number and arrangement of wireless entities (e.g., devices, base stations, etc.) shown in FIG. 1 are provided as an example. In practice, the network 100 may include additional wireless entities, fewer wireless entities, different wireless entities, or differently arranged wireless entities than those shown in FIG. 1.

Referring to FIG. 1, the network 100 may include a number of base stations (shown as BSs), such as base stations 120a, 120b, and 120c, collectively referred to as base stations 120. In some network environments such as a 5G NR network, a base station may be known as a gNodeB, a gNB, and/or the like. In an alternative network environment, a base station may be known by other names. A base station 120 may provide communication coverage for a particular geographic area known as a cell, such as a cell 130a, 130b, or 130c, collectively referred to as cells 130. The radius of a cell size may range from several kilometers to a few meters. A base station may communicate with one or more other base stations or network entities directly or indirectly via a wireless or wireline backhaul.

A network controller 110 may be coupled to a set of base stations such as the base stations 120 to coordinate, configure, and control these base stations 120. The network controller 110 may communicate with the base stations 120 via a backhaul.

The network 100 further includes a number of UEs, such as UEs 150a, 150b, 150c, and 150d, collectively referred to as UEs 150. The UEs 150 may be anywhere in the network 100, and each UE 150 may be stationary or mobile. The transmission from a UE to a base station is called uplink transmission, and from a base station to a UE is called downlink transmission.

In one embodiment, the UEs 150 may communicate with their respective base stations 120 that serve their respective cells 130. A UE may use the cell service from more than one serving cell. For example, UE 150a may have cell 130a as its primary serving cell. The network 100 may (e.g., via base station 120a) direct UE 150a to add cell 130c, which is unknown to UE 150a at this time, as its secondary serving cell. In response, UE 150a performs cell search to acquire synchronization information and to decode the cell ID of cell 130c.

Figure 2:
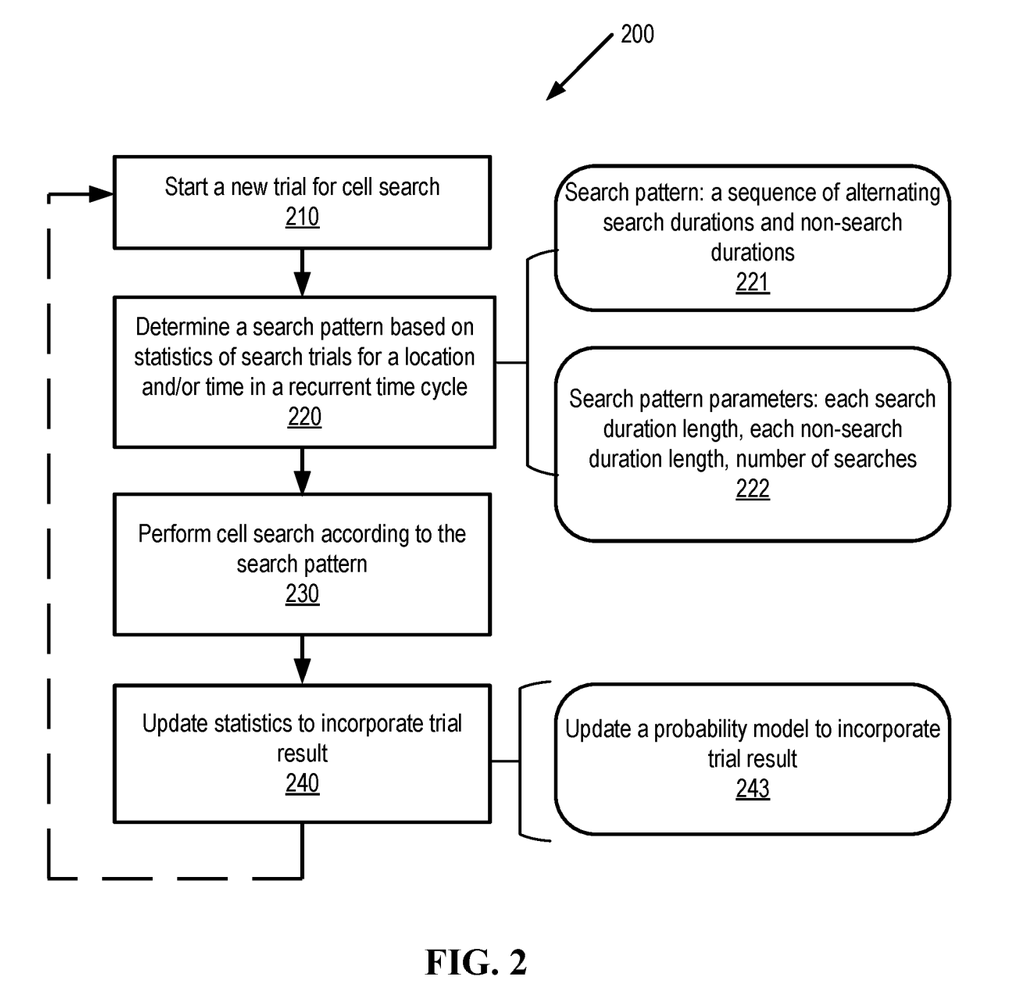
FIG. 2 is a flow diagram illustrating a cell search procedure performed by a UE according to one embodiment.
Figure 5:
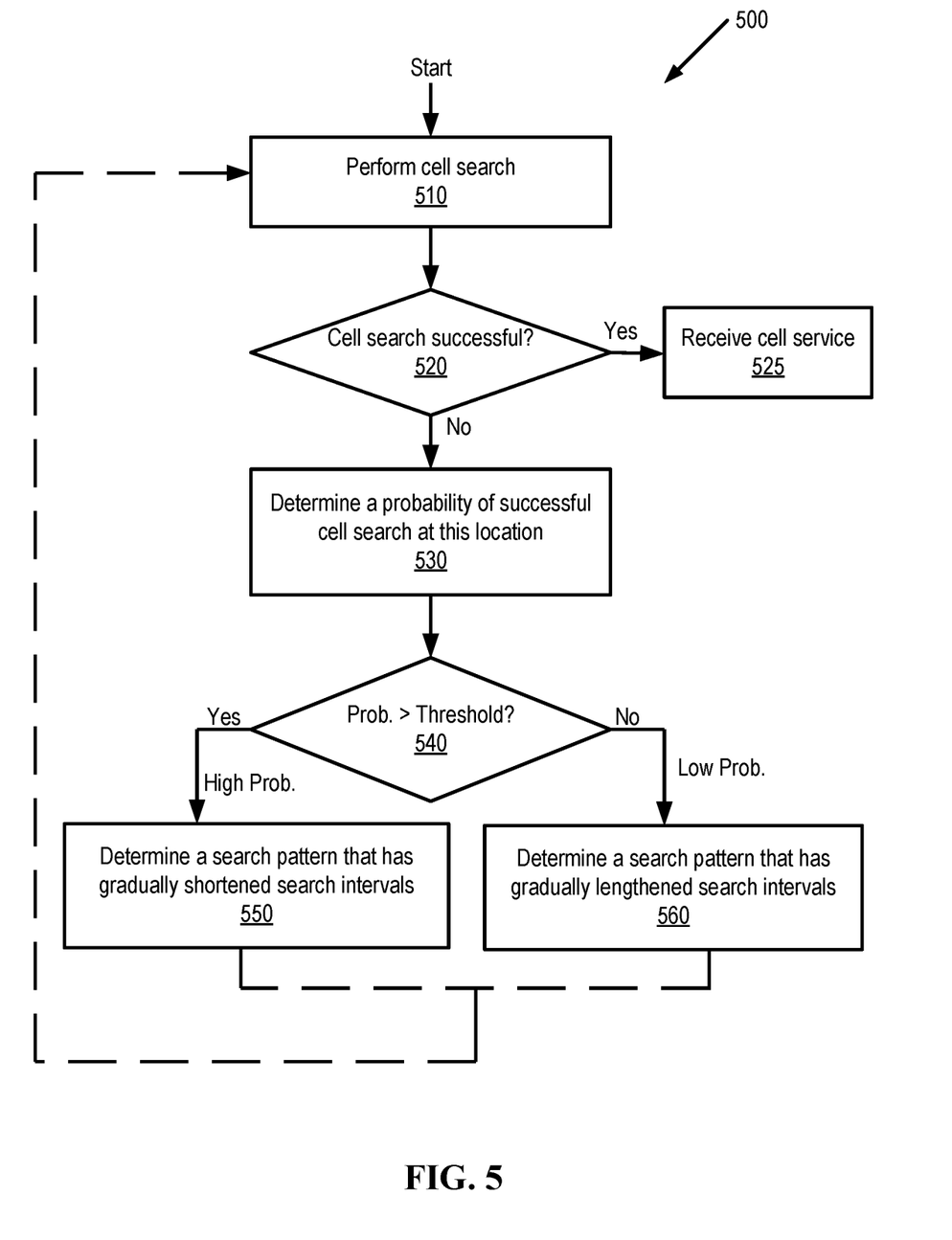
FIG. 5 is a flow diagram illustrating a cell search procedure at a given location according to one embodiment.
Figure 6:
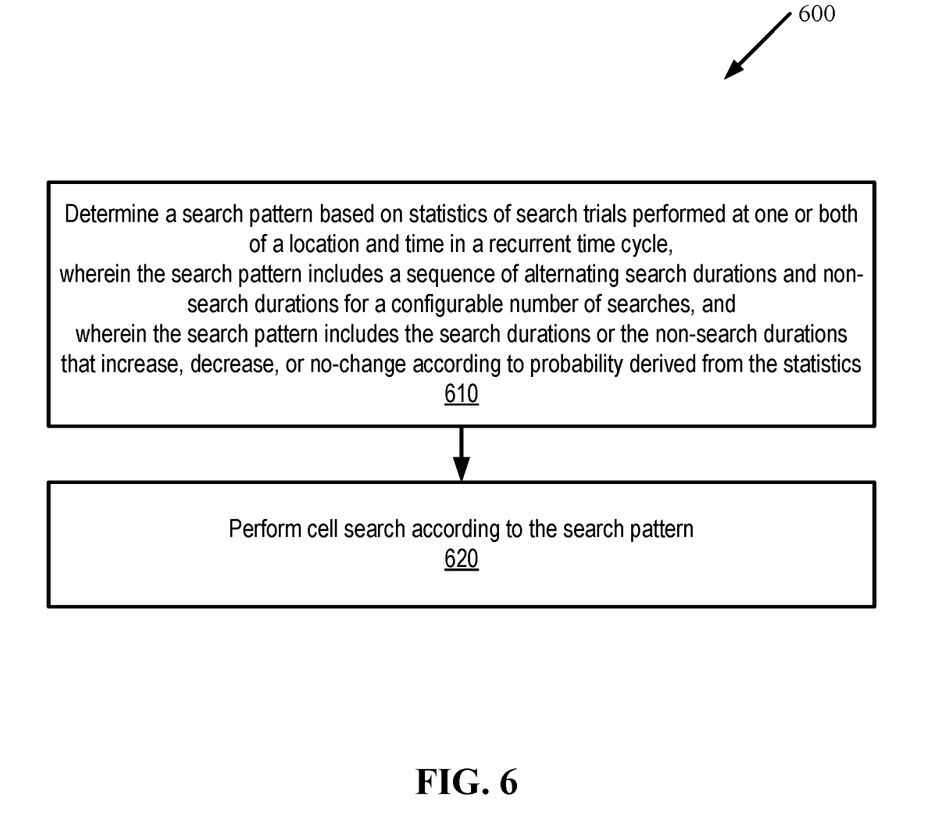
FIG. 6 is a flow diagram illustrating a cell search method performed by a UE according to one embodiment.

A number of cell search procedures and methods are described with references to FIGS. 2, 5, and 6. A UE may perform a cell search when a predefined scenario occurs. A number of non-limiting examples are provided in the following. In one scenario, the UE currently receives a low-speed cell service in a lower-speed wireless network (e.g., a 4G network), and is directed by the network to search for high-speed cell service in a higher-speed wireless network (e.g., a 5G network). The UE may be in the idle mode or connected mode. In other scenarios, a UE may perform a cell search for cell selection or re-selection when the UE is out of service or in need of adding or changing cell service. For example, the UE is currently out-of-service and is ready to select a cell to receive cell service. As another example, the UE detects a drop in received signal power in the current cell and is ready to re-select another cell. As yet another example, the UE is served by a primary cell and is directed by the network to select a secondary cell.

FIG. 2 is a flow diagram illustrating a cell search procedure 200 performed by a UE according to one embodiment. The UE at step 210 starts a new trial for cell search. Before the cell search, the UE at step 220 determines a search pattern based on the statistics of search trials for UE's location and/or the current time period in a recurrent time cycle (e.g., time of day, weekday or weekend, etc.). As indicated in blocks 221 and 222, the search pattern may include a sequence of alternating search durations and non-search durations, and the search pattern parameters include one or more of: the length of each search duration, the length of each non-search duration, the number of searches. These parameters may be used to configure a search pattern that has increasing lengths, decreasing lengths, or same-length of search durations, and/or a search pattern that has increasing lengths, decreasing lengths, or same-length of non-search durations.

At step 230, the UE performs cell search according to the search pattern; e.g., by detecting a downlink reference signal during each search duration. If the detection and decoding are successful within the search pattern, the cell search is successful and the UE may perform subsequent operations to start receiving cell services. If the detection and decoding are unsuccessful at the end of the search pattern, the UE may stop the search. At step 240, the UE may update the statistics to incorporate the search trial result. The UE may update the statistics for the location or time based on the results of the cell search trial. As indicated in block 243, the UE may update a probability model to incorporate the search trial result. The probability model may be derived from the statistics.

A successful search trial may increase the probability for the UE's location and/or current time period, and an unsuccessful search trial may decrease the probability for the UE's location and/or current time period. The procedure 200 may re-start when the UE performs a new cell search.

Figure 3A:
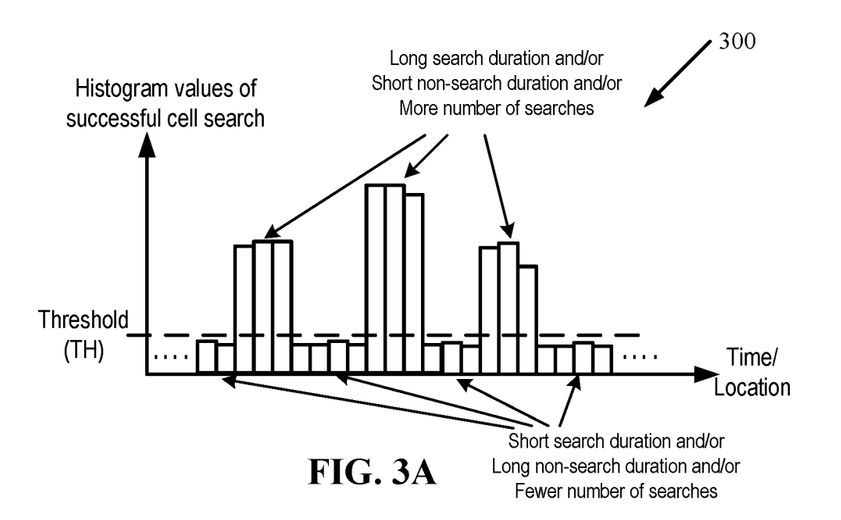
FIG. 3A and FIG. 3B illustrate probability models that may be used by a cell search procedure according to some embodiments.
Figure 3B:
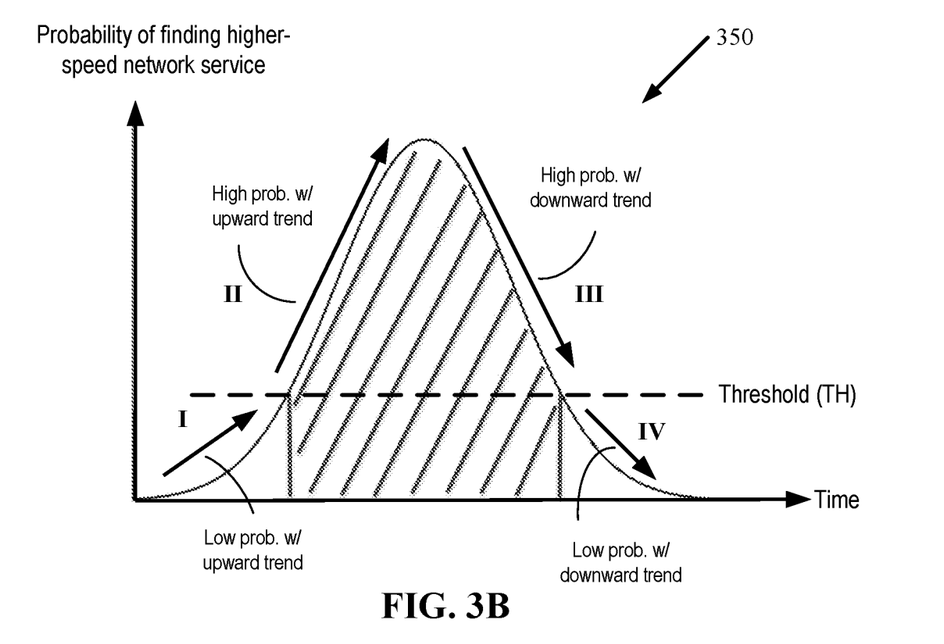

FIG. 3A and FIG. 3B are diagrams illustrating probability models for a given location and a given time period according to some embodiments. In one embodiment, the location of the UE may be indicated by one or more of the following: longitude and latitude, cell ID, tracking area code (TAC) of the cell, mobile network code (MNC) of the cell, mobile country code (MCC) of the cell. The cell ID, TAC, MNC, and MCC may identify a cell in a low-speed wireless network, and the UE may try to acquire the cell ID in a high-speed wireless network (e.g., 5G network) or another cell. Other location information may be inferred from the location information of Wi-Fi, Bluetooth, or other networks accessible to the UE.

The given time period is a repeatable or recurrent time period; e.g., time of day such as 2 pm-11 pm of each day, or every weekday. The probability models may be obtained by the UE based on a presumption, or built based on the big data statistics of search trials performed by hundreds or thousands of UEs over a time span of days, months, or years. The probability models may be stored in a database accessible to the UE online or pre-downloaded to the UE. For example, the probability model for the UE's primary location (e.g., home, office, etc.) may be referenced by the UE frequently and may be downloaded to the UE's memory or storage.

FIG. 3A illustrates a histogram 300 as an example. The X-axis of the histogram 300 represents a location or time, and the Y-axis represents the histogram values of successful cell search. Histogram values above the threshold (TH) are referred to as high probabilities, and histogram values below the threshold (TH) are referred to as low probabilities. When the probability is higher than the threshold, the UE uses a search pattern that includes one or more of the following: long search duration, short non-search duration, more number of searches. When the probability is not higher than the threshold, the UE uses a search pattern that includes one or more of the following: short search duration, long non-search duration, fewer numbers of searches. It is understood that the probability model may be built in the form of a histogram or any other statistical model suitable for modeling the probability of successful cell search for a location and/or a time period.

FIG. 3B illustrates a probability model 350 as an example. The probability model 350 is for a given geographic location (e.g., the UE's location) and a given time. The X-axis of the probability model 350 represents time and the Y-axis represents the probability of successful cell search. Probability values above the threshold (TH) are high probabilities, and probability values below the threshold (TH) are low probabilities. This example illustrates that increasing probability values correspond to more frequent searches in the search pattern, and decreasing probability values correspond to less frequent searches in the search pattern.

In one embodiment, the UE searches with increasing frequency when the probability trends upwards (as in regions I and II), and with decreasing frequency when the probability trends downwards (as in regions III and IV). The UE may use a search timer to set the time for starting each search duration. The search timer may be configured by the length of a search duration plus the length of a non-search duration that immediately follows the search duration. The length of the search timer indicates how frequently the UE searches. For example, the search timer in region I may be a sequence of {50, 40, 30, . . . } time units, and in region IV may be a sequence of {30, 40, 50, . . . } time units, wherein each time unit may be a minute, a second, a millisecond, or the like. That is, in region I the first search duration and the first non-search duration last 50 time units, and the second search duration and the second non-search duration last 40 time units, etc. Similarly, the search timer in regions II and III may be a sequence of {10, 5, 2, 2, 5, 10, . . . } time units, which includes increasing, unchanged, and decreasing search timer values corresponding to the change in the probability values.

Furthermore, in the example of FIG. 3B, each search timer value in the high probability regions (e.g., regions II and III) may include a shorter non-search duration than in the low probability regions (e.g., regions I and IV). Alternatively or additionally, each search timer value in the high probability regions (e.g., regions II and III) may include a longer search duration than in the low probability regions (e.g., regions I and IV). Within each region and/or across regions, the search duration may be increasing, unchanged, or decreasing in accordance with the change in the probability values, and the non-search duration may be increasing, unchanged, or decreasing in accordance with the change in the probability values. In one embodiment, if the UE's camping cell changes during a search trial, the UE may reset the search timer to the initial value.

Figure 4A:
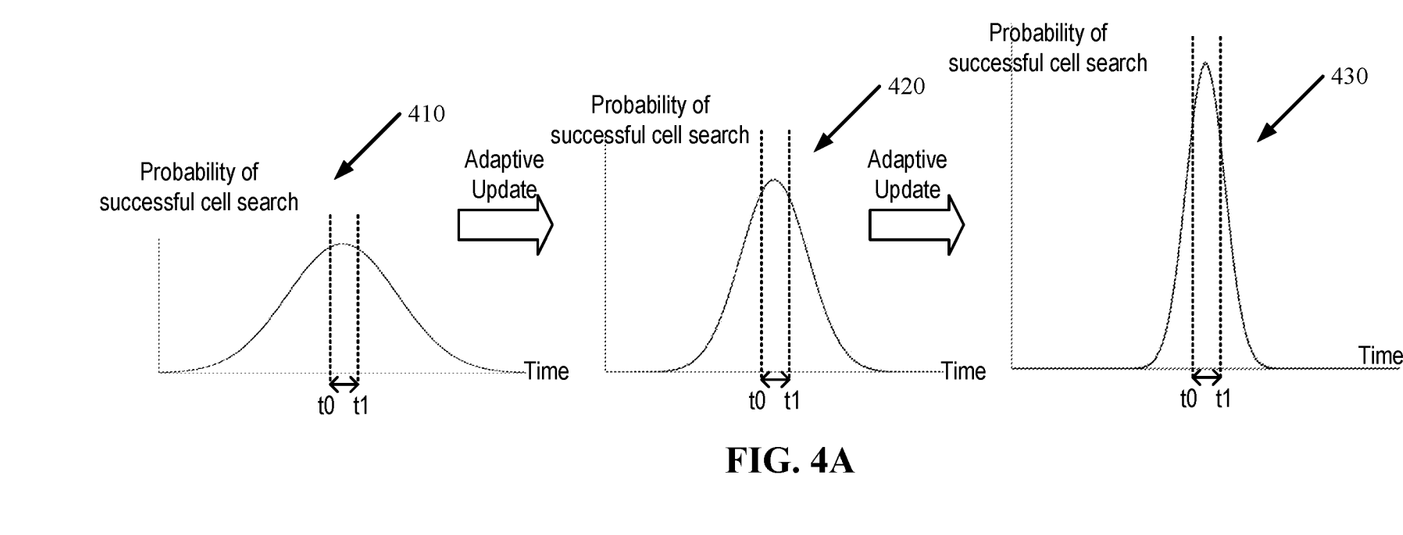
FIG. 4A and FIG. 4B illustrate adaptive adjustments to a probability model according to some embodiments.
Figure 4B:
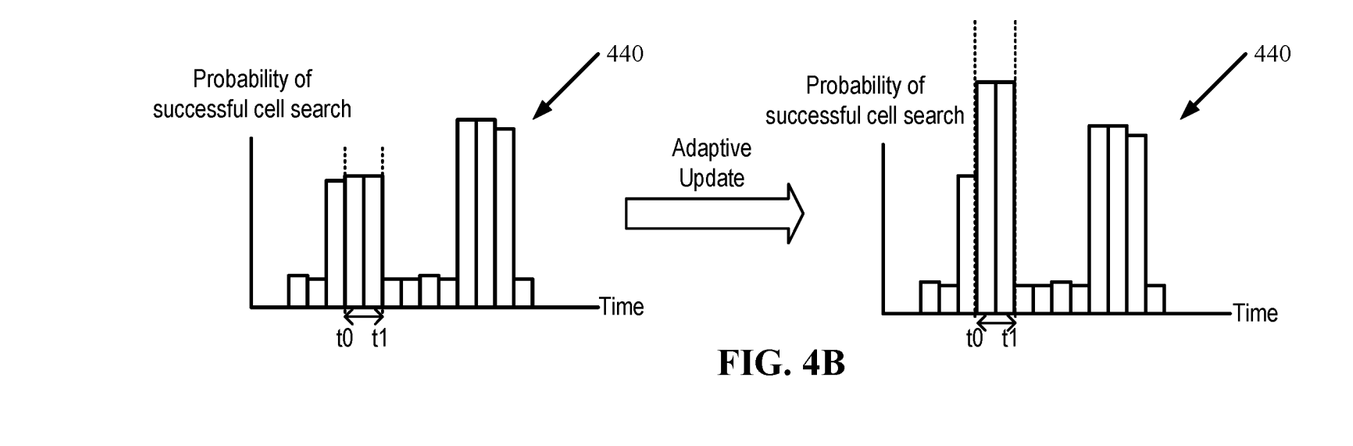

FIG. 4A and FIG. 4B illustrate examples of a UE's adaptive adjustments of probability models. The UE may update a probability model by the results of its own search trials. The UE's search trial results, whether failed or successful, can be used to update the probability model. The initial probability model may be based on a presumption or data aggregated from a large number of UEs over time. The UE may download or otherwise access the initial probability model and adapt it to the device capability and/or user behavior; e.g., the UE's user may habitually turn on the UE at 9 am in a basement garage where the cell signal is low. The UE can adaptively adjust the probability model based on the UE's past search trials.

In one embodiment, the UE may update the probability model using MLE (maximum likelihood estimation), or other statistical methods to evaluate the mean $\mu$ and variance $\sigma^2$ of the probability curve. The UE may also perform machine learning to update the probability model. When the UE identifies a highest probability time period for 5G service, it may apply a search pattern of short search timers in the time period of $\mu \pm n \cdot \sigma$, and applies a search pattern of long search timers outside the time period (n is a predetermined constant), as described above in connection with FIG. 3B.

FIG. 4A illustrates adaptive adjustments of a probability model according to one embodiment. For example, a probability model for a UE's location and a given time period can be updated over time by the UE's search trial results, such as 510 (day 1), 520 (day 2), and 530 (day 3). The time period (t0-t1) indicates the same time period during a day. The UE may have more success in cell search during the given time period (t0-t1), and updates the probability model such that the probability of successful cell search increases in the time period (t0-t1) over time. The UE can use the updated probability model to determine a search pattern at the same location and the same time of day.

FIG. 4B illustrates adaptive adjustments of a probability model according to another embodiment. In this embodiment, the probability model for a UE's location and a given time period can be updated over time, such as histograms 440 and 450. The UE may have more success in cell search during the given time period (t0-t1), and updates the probability model such that the probability of successful cell search increases in the time period (t0-t1) over time. The UE can use the updated probability model to determine a search pattern at the same location and the same time of day.

Although the probability models shown in FIGS. 4A and 4B are for a location and time, it is understood that the UE may use a probability model for a location that applies to all times of usage.

FIG. 5 is a flow diagram illustrating a cell search procedure 500 performed by a UE according to one embodiment. The UE may perform the cell search procedure 500 when it currently receives a low-speed cell service in a lower-speed wireless network (e.g., a 4G network), and is directed by the network to search for high-speed cell service in a higher-speed wireless network (e.g., a 5G network). The UE may perform the cell search procedure 500 when it is out of service. The cell search procedure 500 may also be used in other scenarios For example, when a UE in an area detects that it is out-of-service (OOS), it records its location and calculates the mean, standard deviation, number of successful/failed searches to form an OOS distribution. Different areas may have different OOS distributions. Next time, the UE enters the same area and encounters OOS, it can start a recovery cell search. The UE checks the location-based OOS distribution to determine the time period for starting a recovery search.

The procedure 500 starts when the UE performs a cell search at step 510. The UE at step 520 determines whether the cell search is successful. If the cell search is successful, the UE starts to receive cell service at step 525. If the cell search is unsuccessful, the UE at step 530 determines a probability of successful cell search at the UE's current location. If, at step 540, the probability is higher than a threshold, the UE at step 550 determines a search pattern that has gradually shortened search intervals; that is, the UE searches more frequently. If the probability is not higher than the threshold, the UE at step 560 determines a search pattern that has gradually lengthened search intervals; that is, the UE searches less frequently.

FIG. 6 is a flow diagram illustrating a method 600 for a UE in a wireless network to perform cell search according to one embodiment. The UE may be any of the UEs 150 in FIG. 1 and/or UE 700 in FIG. 7.

The method 600 starts at step 610 when the UE determines a search pattern based on statistics of search trials performed at one or both of a location and time in a recurrent time cycle. The search pattern includes a sequence of alternating search durations and non-search durations for a configurable number of searches. The search pattern includes the search durations or the non-search durations that increase, decrease, or no-change according to the probability derived from the statistics. The UE at step 620 then performs the cell search according to the search pattern.

Figure 7:
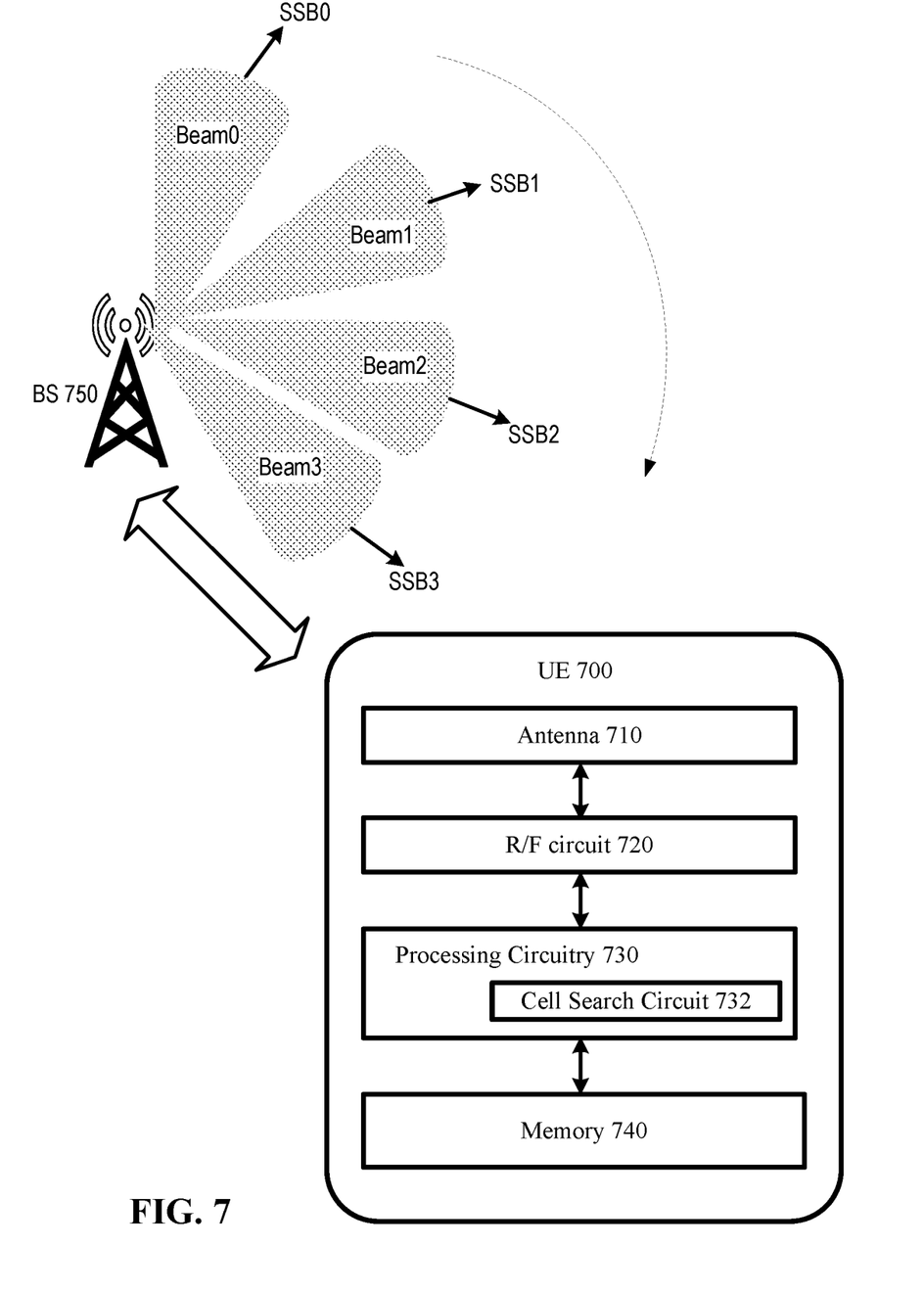
FIG. 7 is a block diagram illustrating a UE in wireless communication with a base station according to one embodiment.

FIG. 7 is a diagram illustrating a UE 700 performing cell search based on reference signals from a base station 750 according to one embodiment. The base station 750 may be any of the base stations 120 and the UE 700 may be any of the UEs 150 in FIG. 1. The base station 650 includes an antenna array to form beams for transmitting downlink signals, including reference signals for the UE 700 to perform cell search.

As shown, the UE 700 may include an antenna 710 and a radio frequency (RF) circuitry 720, which further includes a transmitter and a receiver configured to provide radio communications with another station in a radio access network, such as the base station 750. The UE 700 may also include processing circuitry 730 which may include one or more control processors, signal processors, central processing units, cores, and/or processor cores. In one embodiment, the processing circuitry 730 includes a cell search circuit 732 for performing cell search in accordance with the methods of FIGS. 2, 5, and 6. The UE 700 may also include a memory circuit (also referred to as memory 740) coupled to the processing circuitry 730. The UE 700 may also include an interface (such as a user interface). It is understood the embodiment of FIG. 7 is simplified for illustration purposes. Additional hardware components may be included.

The UE 700 may also be known by other names, such as mobile stations, subscriber units, wireless devices, and/or the like. The UE 700 may be implemented as part of a vehicle, Examples of the UE 700 may include a cellular phone (e.g., a smartphone), a wireless communication device, a handheld device, a laptop computer, a cordless phone, a tablet, a gaming device, a wearable device, an entertainment device, a sensor, an infotainment device, an Internet-of-Things (IoT) device, or any device that can perform wireless communication in a cell with shared spectrum channel access, such as a 5G NR network or another wireless network.

In one embodiment, the UE 700 may store and transmit (internally and/or with other electronic devices over a network) code (composed of software instructions) and data using computer-readable media, such as non-transitory tangible computer-readable media (e.g., computer-readable storage media such as magnetic disks; optical disks; read-only memory; flash memory devices) and transitory computer-readable transmission media (e.g., electrical, optical, acoustical or other forms of propagated signals). For example, the memory 740 may include a non-transitory computer-readable storage medium that stores computer-readable program code. The code, when executed by the processors, causes the processors to perform operations according to embodiments disclosed herein, such as the method disclosed in FIGS. 2, 5, and 6.

Although the UE 700 is used in this disclosure as an example, it is understood that the methodology described herein is applicable to any computing and/or communication device capable of performing wireless communications.

FIG. 7 also illustrates reference signals transmitted from the base station 750 to the UE 700 according to one embodiment. In the example shown in FIG. 7, the base station 750 forms four beams (e.g., Beam0, Beam1, Beam2, and Beam3) in a sweep cycle, each of which transmits a synchronization signal block (SSB) in a direction different from the others. For example, the base station 750 may transmit the beams (along the direction shown by the dotted arrow) in the sequential order of Beam0, Beam1, Beam2, and Beam3 in a sweep cycle. The four beams transmit SSB1, SSB2, SSB3, and SSB4, which form an SSB burst. These beams may be cell-specific; that is, they are broadcast to the entire cell coverage area served by the base station 750. The base station 750 may repeat the beam sweep operation periodically, and generate an SSB burst in each sweep cycle. The UE 700 measures the signal strength (e.g., power) of each SSB in an SSB burst, and identifies the SSB with the strongest signal strength. The identified SSB index (e.g., SSB3) is used by the UE as a reference signal for determining the cell ID. It is understood that the base station 750 may form a different number of beams from what is shown in FIG. 7.

The operations of the flow diagrams of FIGS. 2, 5, and 6 have been described with reference to the exemplary embodiments of FIGS. 1 and 7. However, it should be understood that the operations of the flow diagrams of FIGS. 2, 5, and 6 can be performed by embodiments of the invention other than the embodiments of FIGS. 1 and 7, and the embodiments of FIGS. 1 and 7 can perform operations different than those discussed with reference to the flow diagrams. While the flow diagrams of FIGS. 2, 5, and 6 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for a user equipment terminal (UE) to perform cell search in a wireless network, comprising:
   recording, by the UE, statistics of search trials, wherein the statistics includes a probability model that indicates a probability value of a successful cell search for a given location and each of a plurality of time units spanning over a time period;
   starting a new cell search at the given location and a current time, the current time being in the time period of the probability model;
   determining a search pattern for the new cell search based on the probability model,
      wherein the search pattern includes a sequence of alternating search durations and non-search durations for a configurable number of searches,
      wherein the search pattern includes the search durations or the non-search durations that increase, decrease, or no-change according to probability derived from the statistics,
      wherein upward trending probability values over a time duration in the probability model correspond to successively shorter search timer lengths for a sequence of searches, and downward trending probability values over the time duration in the probability model correspond to successively longer search timer lengths for the sequence of searches, and
      wherein a search time length is a sum of a search duration length and a corresponding non-search duration length; and
   performing the new cell search according to the search pattern.

2. The method of claim 1, further comprising:
   updating the statistics based on cell search results and user behavior including time and location of a user habitually turning on the UE.

3. The method of claim 1, wherein a higher probability corresponds to a longer search duration and a lower probability corresponds to a shorter search duration.

4. The method of claim 1, wherein a higher probability corresponds to a shorter non-search duration and a lower probability corresponds to a longer non-search duration.

5. The method of claim 1, wherein a higher probability corresponds to a greater number of searches in the search pattern and a lower probability corresponds to a fewer number of searches.

6. The method of claim 1, wherein, when the UE is out-of-service, the method further comprises:
   identifying the probability of a successful cell search; and
   determining the search pattern with gradually shortened search intervals when the probability is higher than a threshold, or
   determining the search pattern with gradually lengthened search intervals when the probability is not higher than the threshold.

7. The method of claim 1, wherein determining the search pattern further comprises:
   recording results of search trials in a database accessible to the UE; and
   determining the search pattern based on the statistics retrieved from the database.

8. The method of claim 1, wherein the statistics are recorded as a histogram, the probability model, or other statistical representations.

9. The method of claim 1, further comprising:
updating the probability model using a statistical method or machine learning to evaluate a probability curve calculated from the statistics.

10. The method of claim 1, further comprising:
receiving low-speed cell service in a lower speed wireless network; and
performing the cell search or cell reselection in a higher-speed network in an idle mode or a connected mode of the UE.

11. The method of claim 10, wherein the given location of the UE in the lower speed wireless network is indicated by one or more: longitude and latitude, cell ID, tracking area code (TAC), mobile network code (MNC), and mobile country code (MCC).

12. The method of claim 1, further comprising:
performing the cell search for cell selection or re-selection when the UE is out of service or in need of adding or changing cell service.

13. An apparatus for wireless communication, the apparatus being a user equipment terminal (UE), comprising:
antenna circuitry;
a memory; and
processing circuitry coupled to the memory and operative to perform cell search, the processing circuitry further operative to:
record statistics of search trials, wherein the statistics includes a probability model that indicates a probability value of a successful cell search for a given location and each of a plurality of time units spanning over a time period;
start a new cell search at the given location and a current time, the current time being in the time period of the probability model;
determine a search pattern based on the probability model,
wherein the search pattern includes a sequence of alternating search durations and non-search durations for a configurable number of searches, and
wherein the search pattern includes the search durations or the non-search durations that increase, decrease, or no-change according to probability derived from the statistics,
wherein upward trending probability values over a time duration in the probability model correspond to successively shorter search timer lengths for a sequence of searches, and downward trending probability values over the time duration in the probability model correspond to successively longer search timer lengths for the sequence of searches, and wherein a search time length is a sum of a search duration length and a corresponding non-search duration length; and
perform the new cell search according to the search pattern.

14. The apparatus of claim 13, wherein the processing circuitry is further operative to:
update the statistics based on cell search results and user behavior including time and location of a user habitually turning on the UE.

15. The apparatus of claim 13, wherein a higher probability corresponds to one or more of: a longer search duration, a shorter non-search duration, a greater number of searches in the search pattern; and a lower probability corresponds to one or more of: a shorter search duration, a longer non-search duration, a fewer number of searches in the search pattern.

16. The apparatus of claim 13, wherein, when the UE is out-of-service, the processing circuitry is further operative to:
identify the probability of a successful cell search; and
determine the search pattern with gradually shortened search intervals when the probability is higher than a threshold, or
determine the search pattern with gradually lengthened search intervals when the probability is not higher than the threshold.

17. The apparatus of claim 13, wherein determining the search pattern further comprises:
recording results of search trials in a database accessible to the UE; and
determining the search pattern based on the statistics retrieved from the database.

18. The apparatus of claim 13, wherein the processing circuitry is further operative to:
update the probability model using a statistical method or machine learning to evaluate a probability curve calculated from the statistics.

* * * * *